United States Patent
Romem et al.

(10) Patent No.: US 10,673,947 B2
(45) Date of Patent: Jun. 2, 2020

(54) SYSTEM AND METHOD FOR PROVIDING A CLIENT DEVICE SEAMLESS ACCESS TO A PLURALITY OF REMOTE STORAGE DEVICES PRESENTED AS A VIRTUAL DEVICE

(71) Applicant: Excelero Storage Ltd., Tel Aviv (IL)

(72) Inventors: Yaniv Romem, Jerusalem (IL); Omri Mann, Jerusalem (IL); Ofer Oshri, Kfar Saba (IL)

(73) Assignee: Excelero Storage Ltd., Tel Aviv (IL)

( * ) Notice: Subject to any disclaimer, the term of this patent is extended or adjusted under 35 U.S.C. 154(b) by 0 days.

(21) Appl. No.: 16/282,629

(22) Filed: Feb. 22, 2019

(65) Prior Publication Data

US 2019/0190989 A1  Jun. 20, 2019

Related U.S. Application Data

(63) Continuation of application No. 14/934,830, filed on Nov. 6, 2015, now Pat. No. 10,237,347.

(60) Provisional application No. 62/172,265, filed on Jun. 8, 2015.

(51) Int. Cl.
| | |
|---|---|
| H04L 29/08 | (2006.01) |
| G06F 16/30 | (2019.01) |
| G06F 16/00 | (2019.01) |
| G06F 3/06 | (2006.01) |
| G06F 12/109 | (2016.01) |

(52) U.S. Cl.
CPC .......... *H04L 67/1097* (2013.01); *G06F 3/061* (2013.01); *G06F 3/067* (2013.01); *G06F 3/0665* (2013.01); *G06F 12/109* (2013.01); *G06F 16/00* (2019.01); *G06F 16/30* (2019.01); *G06F 2212/1024* (2013.01); *G06F 2212/154* (2013.01); *G06F 2212/163* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 5,745,671 A | 4/1998 | Hodges | |
| 5,889,934 A | 3/1999 | Peterson | |
| 6,108,812 A | 8/2000 | Born | |
| 8,307,271 B1 | 11/2012 | Liu et al. | |
| 8,407,448 B1 * | 3/2013 | Hayden | G06F 9/45533 711/203 |
| 8,910,031 B1 | 12/2014 | Liu et al. | |

(Continued)

*Primary Examiner* — Philip J Chea
*Assistant Examiner* — Hassan A Khan
(74) *Attorney, Agent, or Firm* — M&B IP Analysts, LLC

(57) ABSTRACT

A computerized method for enabling a client device seamless access to a plurality of remote storage devices connected to the client device via a communication network. The method comprises receiving a plurality of physical addresses by a controller communicatively coupled to the client device and to a plurality of storage servers, each of the plurality of storage servers communicatively coupled to at least one storage device, the plurality of physical addresses enabling access by the controller to the remote storage devices. A single virtual storage device having a logical address space is generated on the device, wherein each of the plurality of physical addresses is mapped by the controller to a unique logical address of the virtual storage device.

11 Claims, 6 Drawing Sheets

(56) References Cited

U.S. PATENT DOCUMENTS

| | | | |
|---|---|---|---|
| 9,467,511 B2 | 10/2016 | Tamir et al. | |
| 9,467,512 B2* | 10/2016 | Tamir | G06F 15/167 |
| 9,529,773 B2 | 12/2016 | Hussain et al. | |
| 9,639,457 B1 | 5/2017 | Piszczek et al. | |
| 2005/0038850 A1 | 2/2005 | Oe et al. | |
| 2006/0059408 A1 | 3/2006 | Chikusa et al. | |
| 2006/0235999 A1 | 10/2006 | Shah et al. | |
| 2008/0109616 A1 | 5/2008 | Taylor | |
| 2009/0300023 A1 | 12/2009 | Vaghani | |
| 2012/0079143 A1* | 3/2012 | Krishnamurthi | H04L 49/90 710/39 |
| 2013/0073821 A1* | 3/2013 | Flynn | G06F 3/061 711/162 |
| 2014/0211808 A1 | 7/2014 | Koren et al. | |
| 2015/0006663 A1* | 1/2015 | Huang | G06F 11/3027 709/213 |
| 2015/0089121 A1* | 3/2015 | Coudhury | G06F 12/0246 711/103 |
| 2015/0319237 A1* | 11/2015 | Hussain | G06F 3/0605 709/217 |
| 2016/0034418 A1 | 2/2016 | Romem et al. | |
| 2016/0036913 A1 | 2/2016 | Romem et al. | |
| 2016/0057224 A1* | 2/2016 | Ori | G06F 3/06 709/213 |
| 2016/0253267 A1* | 9/2016 | Wood | G06F 16/00 711/117 |
| 2016/0266965 A1 | 9/2016 | B et al. | |

\* cited by examiner

SYSTEM AND METHOD FOR PROVIDING A CLIENT DEVICE SEAMLESS ACCESS TO A PLURALITY OF REMOTE STORAGE DEVICES PRESENTED AS A VIRTUAL DEVICE

This Application is a continuation of U.S. patent application Ser. No. 14/934,830, filed Nov. 6, 2015, now allowed, which claims the benefit of U.S. Provisional Application No. 62/172,265, filed on Jun. 8, 2015, the contents of which are incorporated herein by reference.

BACKGROUND

Field

The disclosure generally relates to remote storage access and particularly to remote storage access through use of a virtual storage device

Description of Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Using remote direct memory access (RDMA) allows a client device to access remote storage devices. While this is advantageous in itself, approaches implemented to date use significant processing resources of the client device's central processing unit (CPU) which result in a high access latency. Additionally, such solutions do not offer dynamic use of the remote storage devices, which would allow the client device to request storage as needed.

SUMMARY

To realize some of the advantages there is provided a computerized method for enabling a client device seamless access to a plurality of remote storage devices connected to the client device via a communication network. The method comprises receiving a plurality of physical addresses by a controller communicatively coupled to the client device and to a plurality of storage servers, each of the plurality of storage servers communicatively coupled to at least one storage device, the plurality of physical addresses enabling access by the controller to the remote storage devices. A single virtual storage device having a logical address space is generated on the device, wherein each of the plurality of physical addresses is mapped by the controller to a unique logical address of the virtual storage device.

Another aspect of the disclosed teachings is a network interface card (NIC) for providing a client device seamless access to a plurality of remote storage devices connected to the client device via a communication network comprising a control logic. The control logic further comprises at least one processor and a memory. The memory includes instructions to enable the NIC to receive a plurality of physical addresses, the plurality of physical addresses enabling access by the NIC to the remote storage devices. The memory includes instructions to further generate a single virtual storage device having a logical address space, wherein each of the plurality of physical addresses is mapped by the controller to a unique logical address of the virtual storage device. The memory further includes a map for translating each of a plurality of virtual addresses to a unique physical address of a remote storage device. Yet another aspect of the disclosed teachings is a communication system for providing a client device seamless access to a plurality of remote storage devices connected to the client device via a communication network. The system comprises a network interface card (NIC) and a control logic. The control logic communicates with the NIC. The control logic further comprises at least one processor and a memory, The memory includes instructions to further generate a single virtual storage device having a logical address space, wherein each of the plurality of physical addresses is mapped by the controller to a unique logical address of the virtual storage device. The memory further includes a map for translating each of a plurality of virtual addresses to a unique physical address of a remote storage device.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

Figure 1A:
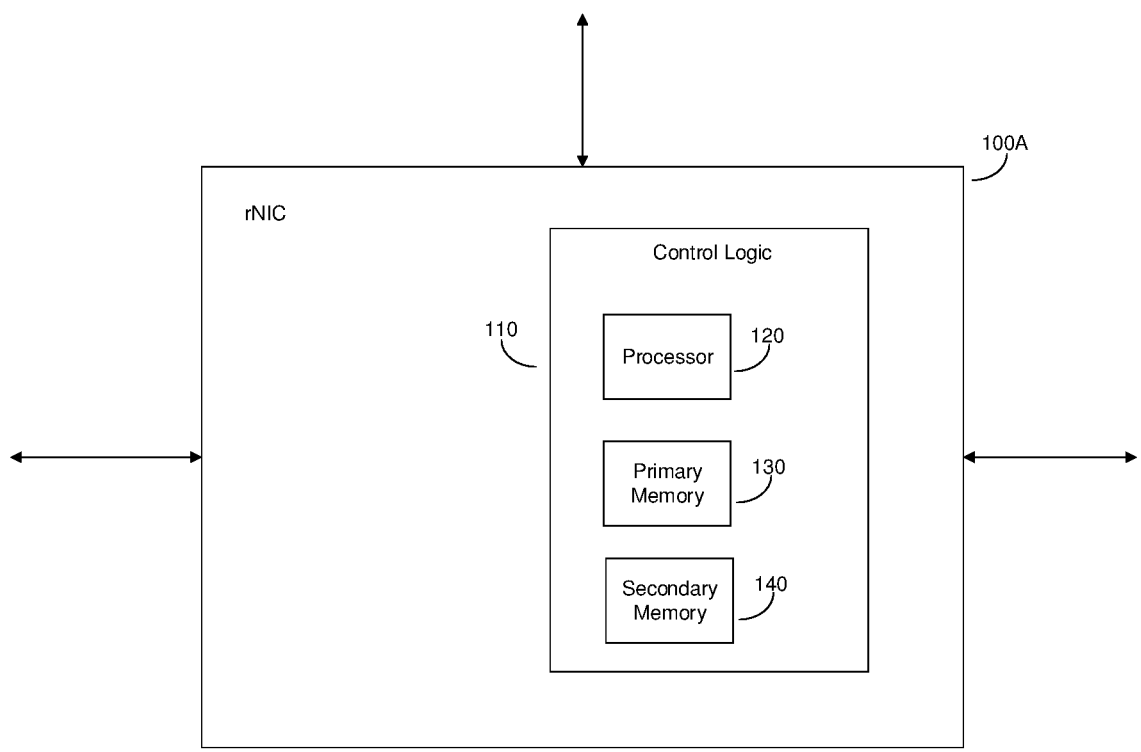
FIG. 1A is a schematic illustration of a network interface controller (NIC) exemplifying some of the disclosed teachings for providing a client device seamless access to a plurality of remote storage devices connected to the client device via a communication network, implemented according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

FIG. 1A is an exemplary and non-limiting schematic illustration of a network interface controller (NIC) 100A for providing a client device seamless access to a plurality of remote storage devices connected to the client device via a communication network, implemented according to an exemplary embodiment. The NIC 100A includes a control logic 110, which further includes at least one processor 120 and a memory. In this illustrated embodiment, the memory comprises a primary memory 130, and a secondary memory 140. Primary memory 130 includes instructions that when executed by the processor 120 performs a method described in more detail herein. Secondary memory 140 includes a map for translating each of a plurality of virtual addresses to a unique physical address of a remote storage device. In some embodiments each virtual address is translated to a unique physical address belonging to one of a plurality of remote storage devices. The NIC 100A is further configured to provide connectivity between the client device and a network. See, e.g. FIG. 3. The NIC 100A may be further configured to provide remote direct memory access to remote storage devices connected to one or more storage servers. Control logic 110 may be implemented, for example, as a field-programmable gate array (FPGA), a complex programmable logic device (CPLD), an application-specific integrated circuit (ASIC), a system on a chip (SoC), etc.

Figure 1B:
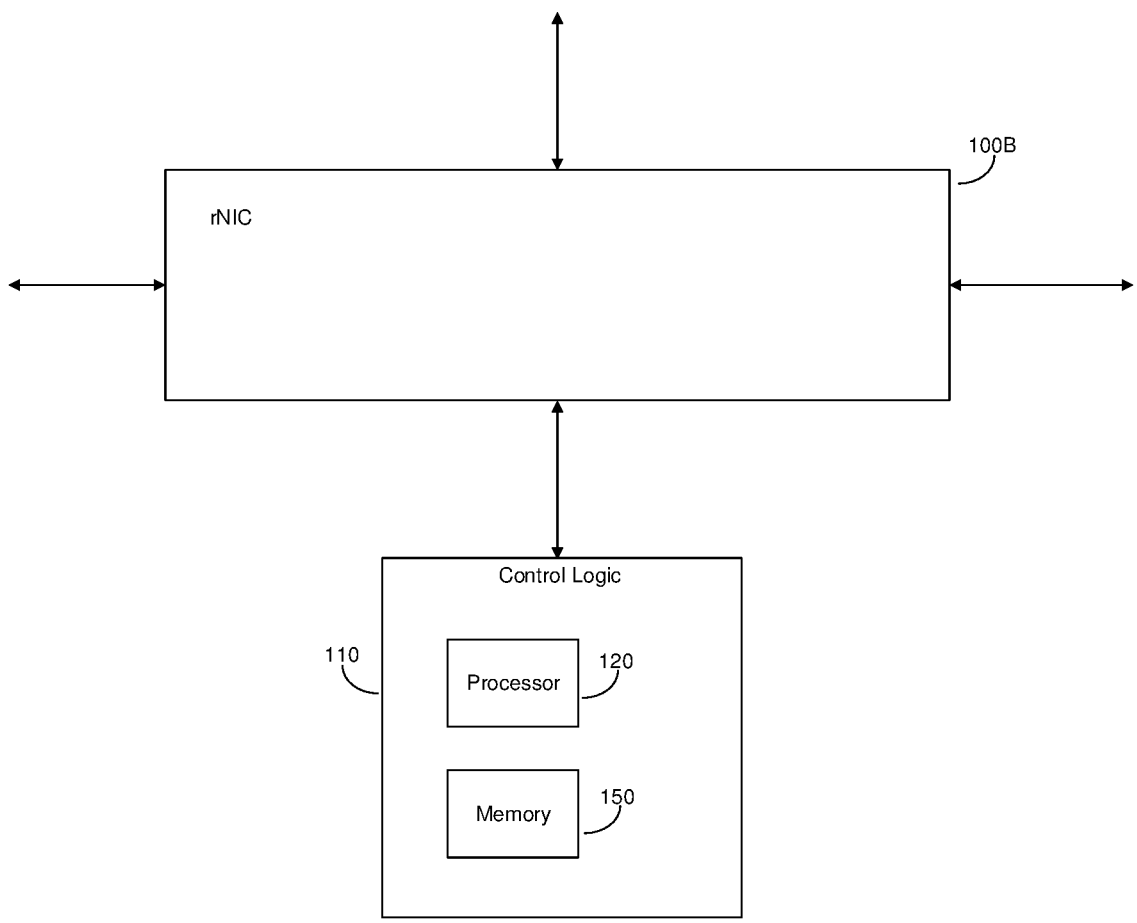
FIG. 1B is a schematic illustration of a NIC exemplifying some of the disclosed teachings for providing a client device seamless access to a plurality of remote storage devices connected to the client device via a communication network, implemented according to another exemplary embodiment.

FIG. 1B is an exemplary and non-limiting schematic illustration of a network interface controller (NIC) 100B for providing a client device seamless access to a plurality of remote storage devices connected to the client device via a communication network, implemented according to another exemplary embodiment. The NIC 100B is communicatively connected to a control logic 110. The control logic 110 includes at least one processor 120, and a memory 150. The memory 150 includes a primary memory portion and a secondary memory portion (neither shown). The primary memory portion includes instructions that when executed by the processor 120 performs a method described in more detail herein. The secondary portion of the memory 150 includes a map for translating each of a plurality of virtual addresses to a unique physical address of a remote storage device. Of course the control logic 110 that is external to the NIC 100B as shown in FIG. 1B can include the primary memory 130 and the secondary memory 140 described above with respect to FIG. 1A. Similarly, the control logic 110 that is internal to the NIC 100A as shown in FIG. 1A can include the memory 150 described above with respect to FIG. 1B. Referring back to FIG. 1B, the NIC 100B is further configured to provide connectivity between a client device to a network (neither shown). See, for example, FIG. 3. The NIC 100B is further configured to provide remote direct memory access to remotely access a storage portion on a storage device communicatively connected a storage server (not shown). See, for example, FIG. 3. Control logic 110 may be implemented, for example, as a field-programmable gate array (FPGA), a complex programmable logic device (CPLD), an application-specific integrated circuit (ASIC), a system on a chip (SoC), etc.

In certain embodiments, the control logic 110 as described in FIG. 1A or FIG. 1B may provide a client device with additional functionalities. For example, the control logic 110 may include a high availability module and a data protection module. Such modules may be provided, for example, by implementing protocols for redundant array of independent disks (RAID). In standard RAID levels, this may include RAID-1, RAID-5 and RAID-6, and in nested RAID levels, this may include RAID-10. The control logic 110 may further provide a space reduction module. A space reduction module may provide thin provisioning, deduplication, compression, and the like.

Figure 2:
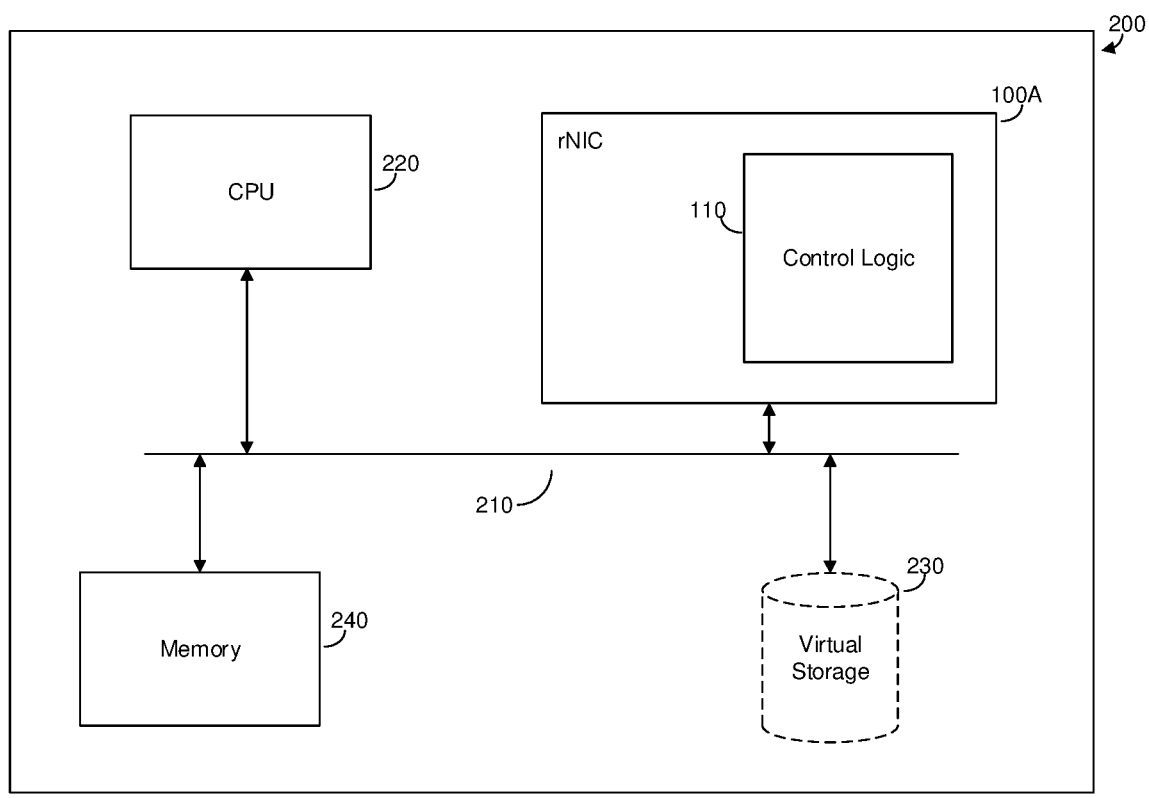
FIG. 2 is a schematic illustration of client device implemented according to aspects of the disclosed teachings exemplifying an embodiment.

FIG. 2 is an exemplary and non-limiting schematic illustration of client device 200 implemented according to an embodiment. The client device 200 includes at least one processing element 220, for example, a central processing unit (CPU). In an embodiment, the processing element 220 may include, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing element 220 is coupled via a bus 210 to a memory 240. The bus supports a first communication protocol and may be, for example, implemented as a Peripheral Component Interconnect Express (PCI Express), Non Volatile Memory Express (NVMe), NVMe-over-Fabrics and the like. The memory 240 may be used as a working scratch pad for the processing element 220, a temporary storage, and others, as the case may be. The memory may be a volatile memory such as, but not limited to random access memory (RAM), or non-volatile memory (NVM), such as, but not limited to, Flash memory. The processing element 220 is further coupled with a NIC 100A. Of course the client device 200 could include NIC 100B, but for simplicity this exemplary embodiment will be described with reference to NIC 100A. The processing element 220 is further coupled via bus 210 to a virtual storage 230. Virtual storage 230 includes a plurality of virtual addresses. Each virtual address is mapped by the control logic 110 to a unique physical address. The unique physical addresses may correspond to a plurality of storage devices, such that the virtual storage includes at least a first physical address on a first storage device, and a second physical address on a second storage device. The storage devices may be communicatively coupled to one or more storage servers. A portion of the plurality of physical addresses may be physical addresses of a local storage device (not shown) communicatively coupled to the client. The virtual storage 230 is presented to the client device 200 by the control logic 110 as a local storage device and the client device 200 communicates to the virtual storage 230 using the first communication protocol. Access instructions are received by the control logic 110 for the virtual storage 230. An access instruction includes at least one virtual address and an action to be performed corresponding to that virtual address. An action may be, for example, 'read', 'write', 'erase', etc. The access instruction is delivered over the first communication protocol and converted by the control logic 110 to the mapped physical address. The NIC 100A sends the converted access instruction through a network over a second communication protocol to the storage device corresponding to the physical address. The second communication protocol may implement, in some embodiments, remote direct memory access (RDMA) protocols, such as but not limited to RDMA over Converged Ethernet (RoCE), Infiniband, and iWARP. In another exemplary embodiment, the communication may be over a peerto-peer (P2P) network. The processing element 220 and/or the memory 240 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

In some embodiments, the control logic 110 may associate the physical addresses with tiers, wherein the tier level reflects an access parameter, such as access latency. A threshold may be selected to determine if a physical address belongs to a first tier, a second tier, and so on. The first tier includes physical addresses having an access latency higher than physical addresses of the second tier. In a tiered system with more than two tiers, each tier includes physical addresses of storage devices which have an access latency that is within the threshold of that tier. Tiering of physical addresses may be advantageous, for example, in an exemplary embodiment where cloning of the data on the virtual storage device is performed, the cloned data may be stored with respect to physical addresses of the second tier, or below. Thus, data which is frequently used by the client device is available in low access latency, whereas replicated data which is used only in certain cases does not use resources with low access latency, thereby increasing the overall system efficiency.

Figure 3:
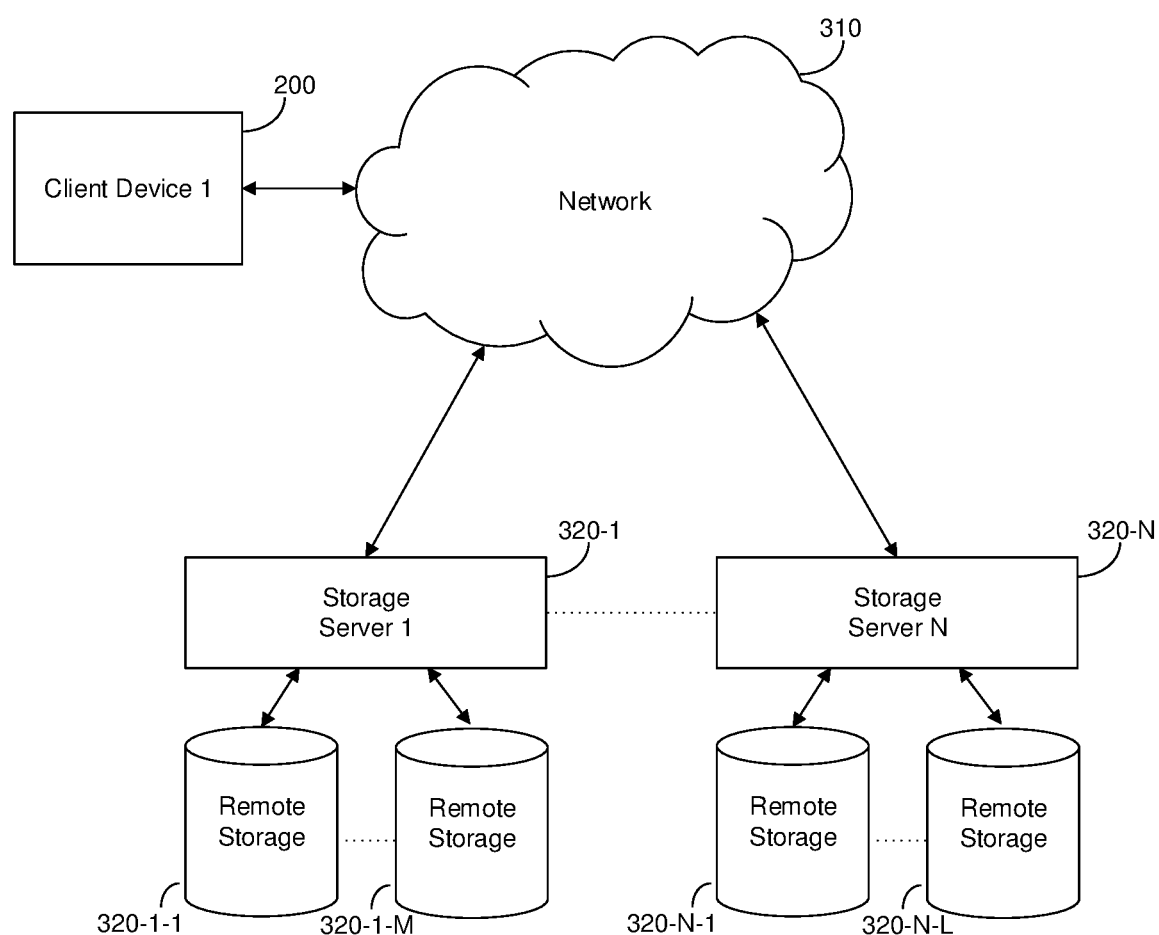
FIG. 3 is a schematic illustration of the client device described with respect to the exemplary embodiment of FIG. 2 connected with storage servers over a network.

FIG. 3 is a non-limiting exemplary schematic illustration of the client device 200 described with respect to FIG. 2 connected with storage servers 320-1 to 320-N over a network 310. Client device 200 is communicatively coupled with network 310. The network 310 is configured to provide connectivity of various sorts, as may be necessary, including but not limited to, wired and/or wireless connectivity, including, for example, local area network (LAN), wide area network (WAN), metro area network (MAN), World Wide Web (WWW), Internet, and any combination thereof, as well as cellular connectivity. Network 310 is further communicatively coupled with storage servers 320, such as storage servers 320-1 through 320-N. Each storage server 320 includes one or more storage devices, such that storage server 320-1 provides access to remote storage devices 320-1-1 through 320-1-M, or portions thereof, and storage server 320-N provides access to remote storage devices 320-N–1 through 320-N-L, or portions thereof.

Figure 4:
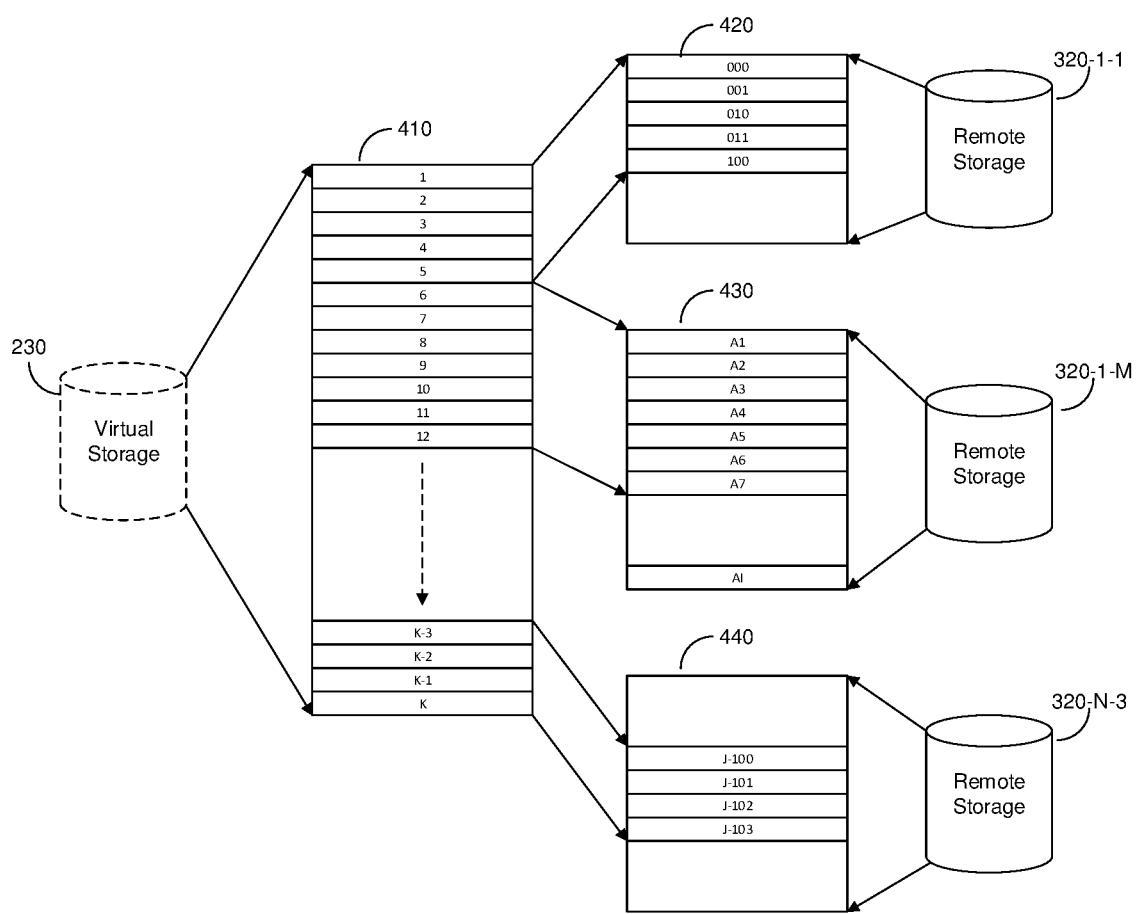
FIG. 4 is a schematic illustration of a map of a virtual storage device according to some aspects of the disclosed teachings in accordance with an exemplary embodiment.

FIG. 4 is a non-limiting exemplary schematic illustration of a map of a virtual storage device 230 in accordance with an embodiment. Virtual storage device 230 includes a plurality of virtual addresses 410. Each virtual address 1 through K is mapped to a unique physical address of a remote storage device. In this exemplary embodiment, virtual addresses 1 through 5 are mapped to physical addresses 000 through 100. Physical addresses 000 through 100 are a portion of the physical addresses 420 of remote storage device 320-1-1. Further in this exemplary embodiment, virtual addresses 6 through 12 are mapped to physical addresses A1 through A7. Physical addresses A1 through A7 are a portion of the physical addresses 430 of remote storage device 320-1-M. Virtual addresses K-3 through K are mapped to physical addresses J-100 through J-103. Physical addresses J-100 through J-103 are a portion of the physical addresses 440 of remote storage device 320-N–3. The client device 200 communicates with the virtual storage device 230 as if it were a seamless local storage device. In certain embodiments, the control logic 100 may increase the size of the virtual storage device 230, for example by having a first virtual address point to a plurality of secondary virtual addresses. The plurality of secondary virtual addresses are then each mapped to a unique physical address.

Figure 5:
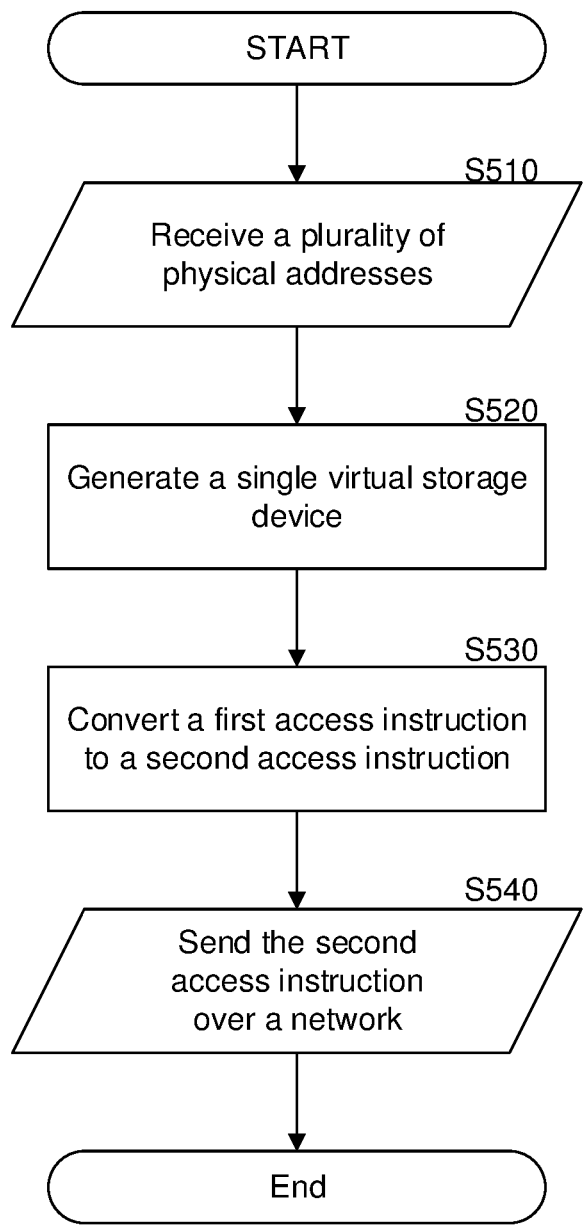
FIG. 5—is a flowchart of a method for providing a client device seamless access to a plurality of remote storage devices connected to the client device via a communication network in accordance with an embodiment.

FIG. 5 is a non-limiting exemplary flowchart of a method for providing a client device 200 seamless access to a plurality of remote storage devices connected to the client device via a communication network in accordance with an embodiment. In S510 a plurality of physical addresses are received by a control logic 110. The control logic 110 is communicatively coupled to a client device 200. The client device includes a NIC which provides connectivity to a plurality of storage servers, such as storage servers 320-1 through 320-N. Each of the plurality of storage servers is communicatively coupled to at least one storage device. The plurality of physical addresses enable the control logic 110 to access the remote storage devices. In S520 a single virtual storage device having a logical address space is generated on the client device 200, wherein each of the plurality of physical addresses is mapped by the control logic to a unique logical address of the virtual storage device. The single virtual storage device may be generated using input/output (I/O) Virtualization. The I/O Virtualization may be implemented, for example, as Single Root I/O Virtualization (SR-IOV). In some embodiment, SR-IOV may be used to generate a plurality of single virtual storage devices, each implemented in accordance with the methods described herein. In S530 a first access instruction is converted by the control logic 110. An access instruction includes at least one virtual address and an action to be performed by the storage device corresponding to that virtual address. An action may be, for example, 'read', 'write', 'erase', etc. The first access instruction is received over a first communication protocol. In an embodiment, the first communication protocol is NVMExpress. The first access instruction includes at least a first address within the logical address space. The control logic 110 converts the first access instruction to a second access instruction wherein the at least a first address within the logical address space is mapped to at least a first physical address corresponding to the mapping of the logical address space to the plurality of physical addresses. In S540 the second access instruction is sent by the NIC over a second communication protocol to at least a storage server of the plurality of storage servers corresponding to the at least one of the plurality of physical addresses. The second communication protocol may implement, in some embodiments, remote direct memory access (RDMA) protocols, such as but not limited to RDMA over Converged Ethernet (RoCE), Infiniband, and iWARP. In another exemplary embodiment, the communication may be over a peer-to-peer (P2P) network.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for enabling a client device seamless access to a plurality of remote storage devices connected to the client device via a communication network, comprising:
    a network interface controller (NIC);
    a processing circuitry; and
    a memory, the memory containing instructions that, when executed by the processing circuitry, configure the system to:
    receive a plurality of physical addresses by the network interface controller communicatively coupled to the client device and to a plurality of storage servers, each physical address, when received, not being associated with any logical address of the client device, each of the plurality of storage servers communicatively coupled to at least one storage device, the plurality of physical addresses enabling access by the NIC to the remote storage devices; and
    generate for the client device by the network interface controller a single virtual storage device having a logical address space by mapping, by the network interface controller, each of the plurality of received physical addresses to at least a unique logical address of the virtual storage device; and
    present, by the network interface controller, the single virtual storage device to the client to be used as a local storage device by the client.

2. The system of claim 1, wherein the system is further configured:
    receive a first access instruction having a first logical address within the logical address space, the first access instruction according to a first communication protocol;
    convert by the controller the first address to a second access instruction according to a second communication protocol, wherein the first logical address is mapped to a physical address of the plurality of physical addresses; and
    send the second access instruction over the second communication protocol to at least a storage server of the plurality of storage servers corresponding to the physical address.

3. The system of claim 2, wherein the first communication protocol is NVMExpress.

4. The system of claim 2, wherein the second communication protocol is an implementation of remote direct memory access (RDMA).

5. The system of claim 4, wherein the implementation is any of: iWARP, Infiniband, or RDMA over Converged Ethernet (RoCE).

6. The system of claim 1, wherein the system is further configured to:
    send a request for an additional physical address; and
    map a received additional physical address to a unique logical address of the logical address space.

7. The system of claim 1, wherein the system is further configured to:
    send a request for a plurality of additional physical addresses;
    map a virtual address of the plurality of virtual addresses to a secondary virtual address of a secondary plurality of virtual addresses; and
    map each additional physical layer to a unique secondary virtual address.

8. The system of claim 1, wherein the single virtual storage is generated using input/output (I/O) virtualization.

9. The system of claim 1, wherein the I/O virtualization is Single Root I/O Virtualization (SR-IOV).

10. The system of claim 9, wherein the I/O virtualization generates a plurality of single virtual storages.

11. The system of claim 1, wherein the system is further configured to:
    receive a second plurality of physical addresses by the controller, the second plurality of physical addresses enabling access by the NIC to a local storage device communicatively coupled to the client device; and
    map the second plurality of physical addresses to the logical address space.

* * * * *